United States Patent [19]

Ledebuhr

[11] Patent Number: 4,687,301
[45] Date of Patent: Aug. 18, 1987

[54] FULL-COLOR PROJECTOR SYSTEM WITH A TRICOLOR-SEPARATING PRISM

[75] Inventor: Arno G. Ledebuhr, Fullerton, Calif.

[73] Assignee: Hughes Aircraft Company, Los Angeles, Calif.

[21] Appl. No.: 754,802

[22] Filed: Jul. 12, 1985

[51] Int. Cl.$^4$ ............... G02F 1/13; G02B 5/30; G02B 27/18; H04N 9/31

[52] U.S. Cl. ............... 350/401; 350/337; 353/31; 358/61

[58] Field of Search ............ 350/337, 331 R, 401–403, 350/408, 345, 394, 342; 353/31, 34, 37; 358/60, 61

[56] References Cited

U.S. PATENT DOCUMENTS

| | | | |
|---|---|---|---|
| 4,425,028 | 1/1984 | Gagnon et al. | 350/337 |
| 4,461,542 | 7/1984 | Gagnon | 353/31 |
| 4,464,019 | 8/1984 | Gagnon | 353/31 |
| 4,544,237 | 10/1985 | Gagnon | 350/408 X |

*Primary Examiner*—Bruce Y. Arnold
*Attorney, Agent, or Firm*—Thomas A. Runk; A. W. Karambelas

[57] ABSTRACT

A liquid crystal light valve projector is disclosed which includes a first color separator responsive to unmodulated polarized light for reflecting light of a first primary color, for transmitting the remaining portion of the incident unmodulated polarized light, and for internally reflecting incident light; a transparent plate window for transmitting incident unmodulated polarized light to the first color separator and for internally reflecting the light of the first primary color reflected by the first color separator; a second color separator responsive to the light transmitted by the first color separator for reflecting light of a second primary color and for transmitting the remaining portion of the incident light which includes a third primary color, whereby the second color separator reflects the light of the second primary color to the first color separator which internally reflects such second primary color light; and light modulators respectively responsive to the light of the first, second, and third primary colors.

24 Claims, 2 Drawing Figures

FULL-COLOR PROJECTOR SYSTEM WITH A TRICOLOR-SEPARATING PRISM

BACKGROUND OF THE INVENTION

The disclosed invention generally relates to liquid crystal light valve projectors, and is particularly directed to a liquid crystal light valve projector having respective cathode ray tube light valve assemblies with coplanar optical axes and which can be packaged in a small volume.

The development of liquid crystal light valve (LCLV) technology has resulted in the development of large screen projectors which utilize one or more LCLV's to modulate the light being projected. The LCLV's are selectively modulated by respective appropriate apparatus such as cathode ray tubes (CRT).

Color liquid crystal light valve projectors typically include color separating apparatus such as prisms or beamsplitters for separating white light into the three primary color bands; namely, red, green, and blue light components. The red, green, and blue components are individually modulated by respective light valves for projection. Examples of color LCLV projectors are set forth in U.S. Pat. No. 4,425,028, issued to R. J. Gagnon et al. on Jan. 10, 1984, and assigned to the assignee of this application; and in U.S. Pat. No. 4,461,542, issued to R. J. Gagnon on July 24, 1984, and also assigned to the assignee of the subject application.

As noted above, various color separating apparatus have been and are utilized to separate the primary colors for respective individual modulation. For example, dichroic mirrors have been utilized, but they tend to exhibit astigmatism and polarization sensitivity. The article "Colour Separation in Colour-Television Cameras," DeLang et al., *Philips Tech. Rev.*, Vol. 24, No. 9, pp. 263-298, 1963, discloses a three color separating prism assembly for avoiding the problems associated with dichroic mirrors, and which includes dichroic mirrors immersed in separate solid glass prisms or wedges. However, in view of the heat generated in a projector, such a prism assembly would probably suffer from stress birefringence if used in a projector, and was primarily used in television cameras where heat generation is substantially less significant. Accordingly, known liquid crystal light projectors could not utilize the advantages of a color separating prism assembly having glass prisms or wedges, and instead utilized other color separation structures which do not provide the same performance.

Some known color separating apparatus include dichroic mirrors which intersect each other. In addition to the care required in manufacture, possible image degradation resulting from the intersecting edges may be an important consideration.

A characteristic of some known liquid crystal light valve projectors is that the respective color channels include unequal path lengths due to the optical structure of the color separation apparatus. As a result, image quality is degraded.

Some other known liquid crystal light valve projectors utilize both axes of polarization, and as a result are characterized by reduced contrast. Further, the use of both axes of polarization generally requires placement of the CRT light valve assemblies in different planes. The use of both axes of polarization may be an important consideration in some display systems including those known as "in-line infinity" display systems or "pancake window" display systems. In-line infinity display systems, which contain polarizing elements, provide better transmission efficiency when illuminated with polarized light having a single axis of polarization. Illumination with two axis polarized light or unpolarized light would result in a substantial amount of light being removed by polarizing elements. Examples of in-line infinity display systems are referenced in a Farrand Optical Co., Inc. brochure M-129B, November 1974.

SUMMARY OF THE INVENTION

It would therefore be an advantage to provide a liquid crystal light valve projector having color separating apparatus which does not exhibit polarization sensitivity, stress birefringence, or astigmatism.

It would also be an advantage to provide a liquid crystal light valve projector which utilizes only one axis of polarization and provides a high contrast ratio.

Another advantage would be to provide a liquid crystal light valve projector which provides for substantially equal optical path lengths for all color channels.

Still another advantage would be to provide a liquid crystal light valve projector which allows for placement of the cathode ray tube light valve assemblies on a common plane to achieve compactness and structural simplicity.

Yet another advantage would be to provide an additive color display of high brightness, high contrast, and high color purity.

The foregoing and other advantages and features are provided in a liquid crystal light valve projector which includes a first color separator responsive to unmodulated polarized light for reflecting light of a first primary color, for transmitting the remaining portion of the incident unmodulated polarized light, and for internally reflecting incident light; a transparent plate window for transmitting incident unmodulated polarized light to the first color separator and for internally reflecting the light of the first primary color reflected by the first color separator; a second color separator responsive to the light transmitted by the first color separator for reflecting light of a second primary color and for transmitting the remaining portion of the incident light which includes a third primary color, whereby the second color separator reflects the light of the second primary color to the first color separator which internally reflects such second primary color light; and light modulators respectively responsive to the light of the first, second, and third primary colors. The first color separator, the transparent plate window, and the second color separator are optically coupled with an index matching optical fluid. The first color separator includes a parallel plate assembly having two parallel plates separated by a small air gap. One plate has a dichroic coating on the side adjacent the air gap for reflecting the first primary color; the other plate has an anti-reflection coating on the side adjacent the air gap for transmitting the second and third primary colors. The first and second color separators further function to combine the respective modulated light provided by the light modulators. The use of a small air gap between parallel plates minimizes the astigmatism introduced by the air gap. The color separating apparatus of the invention provides for low astigmatism, reduced weight, ease of manufacture, reduced sensitivity to stress birefringence, and excellent color separation and combining.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

Figure 1:
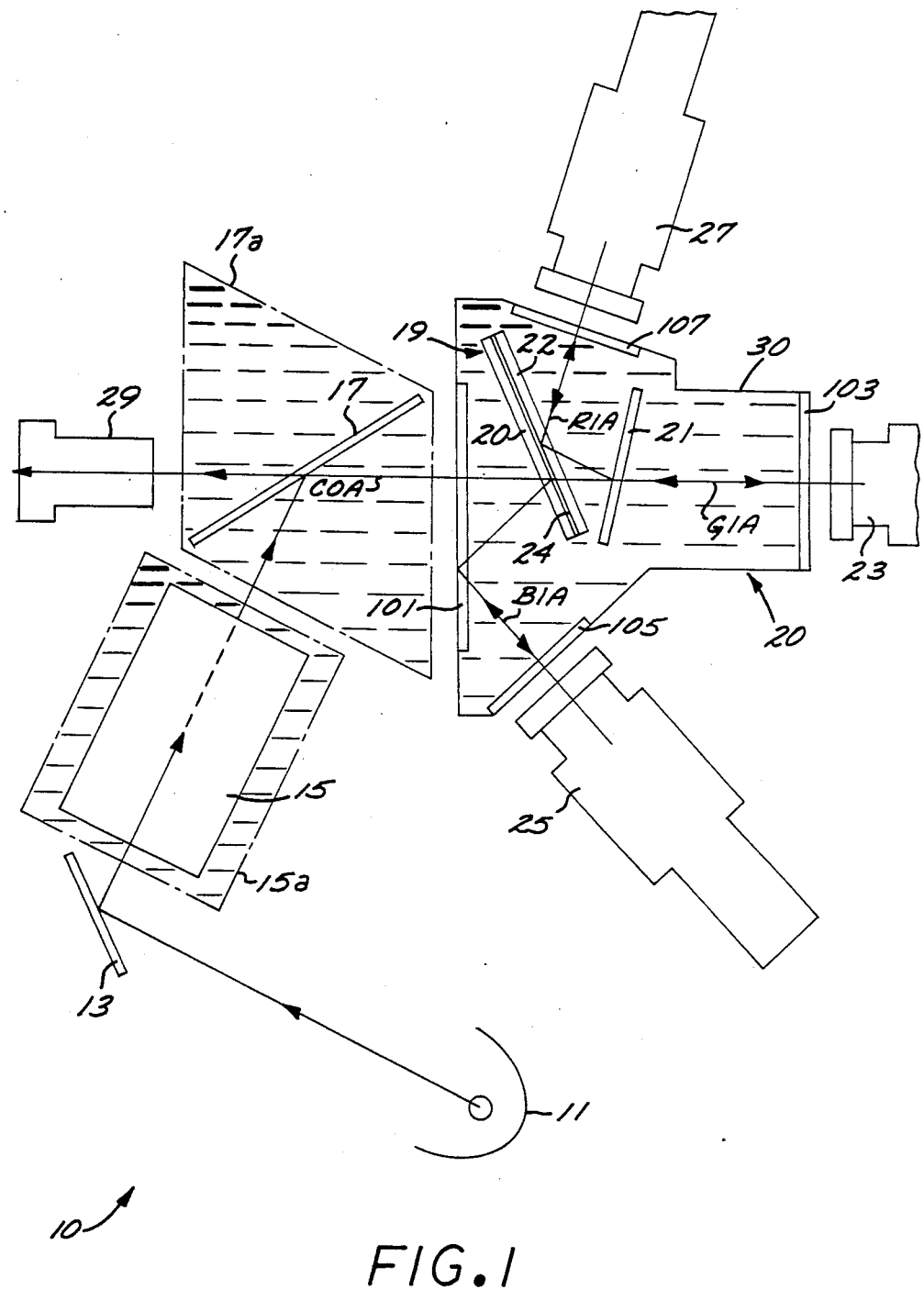
FIG. 1 is a schematic top plan view of the disclosed liquid crystal light valve projector.

In the following detailed description and in the several figures of the drawing, like elements are identified with like reference numerals. Also, the figures are not drawn to scale.

Referring now to FIG. 1, shown therein is a liquid crystal light valve (LCLV) projector 10 which includes an arc lamp illumination source 11 which provides unpolarized white light to a cold mirror 13. As is well known, a cold mirror reflects visible light and transmits radiation in the infrared region. The light reflected from the cold mirror 13 is directed to a prepolarizer 15 of the MacNeille type. The prepolarizer 15 transmits unmodulated light of a first polarization state to a polarizer/analyzer 17, also of the MacNeille type, which reflects light having the first polarization state, and which transmits light having a second polarization state. Such reflected unmodulated polarized light is directed along a central optic axis COA to a color separating assembly 20 which is filled with an index matching optical fluid.

For better performance, the prepolarizer 15 and the polarizer/analyzer 17 are preferably mounted in respective optical tanks 15a, 17a which are filled with index matching optical fluid. Alternatively, the prepolarizer 15 and the polarizer/analyzer 17 may be mounted in one optical tank filled with index matching fluid.

By way of example, the prepolarizer 15 is positioned at thirty-two degrees relative the incident light and is tilted so that the edge closest to the polarizer/analyzer 17 is above the plane of FIG. 1. Thus, the angle of incidence for the incident unpolarized light is fifty-eight degrees. Also by way of example, the polarizer/analyzer 17 is perpendicular to the plane of FIG. 1 and is positioned at thirty-two degrees relative to the incident polarized beam. The angle of incidence on the polarizer/analyzer of the light from the prepolarizer 15 is therefore fifty-eight degrees.

Figure 2:
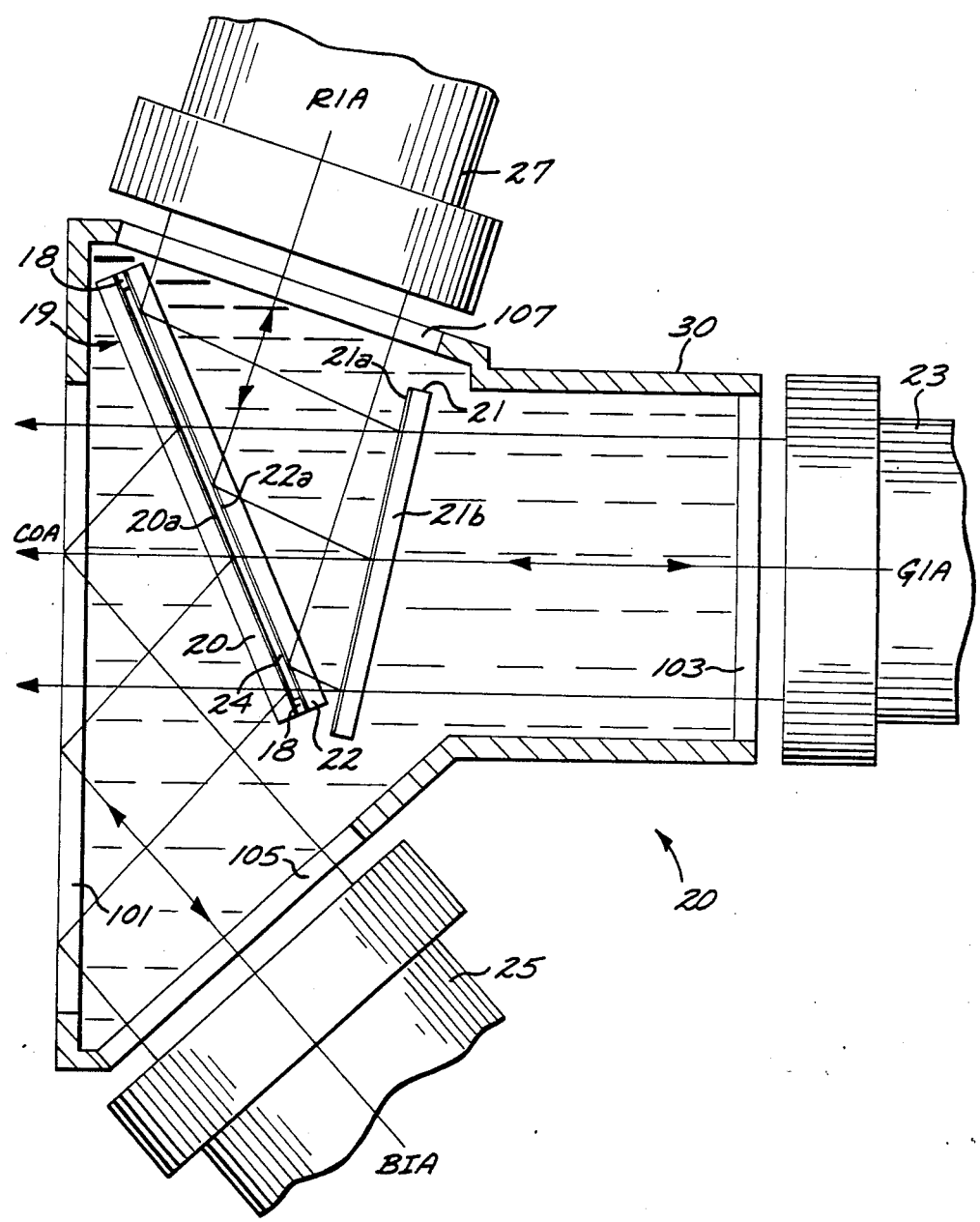
FIG. 2 is a detail top plan view of the color separating assembly of the liquid crystal light valve projector of FIG. 1.

The color separating assembly 20 is more particularly shown in FIG. 2, and includes elements which are perpendicular to the plane of FIG. 2. Specifically, the color separating assembly 20 includes a window 101, essentially a transparent plate, which is perpendicular to the central optic axis COA and is illuminated by the unmodulated polarized light reflected by the polarizer/analyzer 17. The light passing through the window 101 illuminates a parallel plate blue dichroic separator 19 which includes a first plate 20 and a second plate 22. The first plate 20 and the second plate 22 are separated and maintained parallel by a sealing shim 18 which surrounds the periphery of the region between the plates 20, 22. The sealing shim 18 provides for a sealed air gap 24 between the first plate 20 and the second plate 22. The air gap 24 should be small, on the order of 0.005 inches, which minimizes the astigmatism introduced by the air gap.

The air gap side of the first plate 20 is coated with a dichroic coating 20a which reflects blue light and transmits other colors of the incident light. The air gap side of the second plate 22 is coated with an anti-reflection coating 22a which is optimized for transmission of incident red and green light.

With the foregoing described examples of angular positions for the prepolarizer 15 and the polarizer/analyzer 17, the air gap parallel plate blue dichroic separator 19 may be positioned so that the acute angle it forms with the central optic axis COA is sixty-six degrees. The angle of incidence of the incident unmodulated polarized light is therefore twenty-four degrees.

The parallel plate blue dichroic separator 19 reflects the blue portion of the incident unmodulated polarized light and transmits the remaining portion, which in this case includes the red and green portions. The light transmitted through the parallel plate blue dichroic separator 19 illuminates a red dichroic separator 21 which includes a dichroic layer 21a on the side of a plate 21b that is illuminated by the unmodulated polarized light. The red dichroic separator 21 reflects the red portion of the incident unmodulated polarized light and transmits the remaining portion, which is the green portion, along a green illumination axis GIA which is colinear with the central optic axis COA. By way of example, the red dichroic separator 21 forms an acute angle of seventy-eight degrees relative to the central optic axis COA. Thus, the angle of incidence of the incident unmodulated polarized light is twelve degrees.

The green light transmitted by the red dichroic separator 21 passes through a window 103 in the color separating assembly 20 which is perpendicular to the green illumination axis GIA. The transmitted green light illuminates the liquid crystal light valve of a cathode ray tube (CRT) light valve assembly 23. As is well known, the CRT light valve assembly 23 provides reflected light which is polarization modulated. The CRT light valve assembly 23 modulates the green portions of the image for projection.

The blue light reflected by the parallel plate blue dichroic separator 19 illuminates the window 101 which reflects the blue light along a blue light illumination axis BIA which is coplanar with the central optic axis COA. The window 101 reflects the blue light since the angle of incidence is forty-eight degrees. As is well known, for a window having an index of refraction greater than air, a window/air boundary provides internal reflections for large angles of incidence for radiation approaching such boundary through the window.

The blue unmodulated polarized light reflected by the window 101 passes through a window 105 in the color separating assembly 20 which is perpendicular to the blue illumination axis BIA. The transmitted blue light illuminates the light valve of a CRT light valve assembly 25 which modulates the blue portions of the image for projection.

The red unmodulated polarized light reflected by the red dichroic separator 21 illuminates the parallel plate blue dichroic separator 19. As a result of the foregoing described angular positions, the angle of incidence of the red unmodulated polarized light on the parallel plate blue dichroic separator 19 is forty-eight degrees. Therefore, the red unmodulated polarized light passing through the second plate 22 is internally reflected at the coating/air boundary formed by the anti-reflection coating 22a on the plate 22 and the air gap 24. Such reflected red light travels along a red light illumination axis RIA which is coplanar with the central optic axis COA and the blue illumination axis BIA.

The unmodulated polarized red light reflected by the parallel plate blue dichroic separator 19 passes through a window 107 in the color separating assembly 20 which is perpendicular to the red illumination axis RIA. The transmitted red light illuminates the liquid crystal light valve of a CRT light valve assembly 27 which modulates the red portions of the image for projection.

The blue dichroic layer 20a can be provided as a plurality of thin layers of coating materials having selected indices of refraction. For the angles utilized herein, a multi-layer composition may be utilized which includes a material H having a higher index of refraction of 2.32 (e.g., titanium dioxide) and a material L having a lower index of refraction of 1.46 (e.g., silicon dioxide). The lower index material L should have the same index of refraction as the plate 20. The following Table I sets forth the material of respective layers and multiplication factors utilized to obtain the thicknesses of such layers. To obtain the actual thickness of a particular layer, one-fourth of the wavelength of interest is multiplied by the appropriate factor set forth in Table I. For the reflection of blue light, the wavelength of interest may be 422 nanometers, which has a quarter wavelength of 105.5 nanometers. The first layer in Table I is adjacent the air gap 24, and the last layer is adjacent the plate 20.

TABLE I

| Layer No. | Material | Factor |
|---|---|---|
| 1 | H | 2.167 |
| 2 | L | 1.015 |
| 3 | H | .976 |
| 4 | L | .997 |
| 5 | H | 1.124 |
| 6 | L | 1.102 |
| 7 | H | 1.101 |
| 8 | L | 1.045 |
| 9 | H | 1.124 |
| 10 | L | 1.104 |
| 11 | H | 1.103 |
| 12 | L | 1.048 |
| 13 | H | 1.165 |
| 14 | L | 1.062 |
| 15 | H | 1.125 |
| 16 | L | 1.051 |
| 17 | H | 1.130 |
| 18 | L | 1.028 |
| 19 | H | 1.149 |
| 20 | L | .957 |
| 21 | H | 1.124 |
| 22 | L | .988 |
| 23 | H | 1.067 |
| 24 | L | .526 |

The red dichroic layer 21a may also be a multi-layer composition which includes alternating layers of a material H having a higher index of refraction of 2.32 (e.g., titanium dioxide) and a material L having a lower index of refraction of 1.46 (e.g., silicon dioxide). The lower index material L should have the same index of refraction as the plate 21b of the red dichroic separator 21. In a manner similar to Table I, the following Table II sets forth the material of respective layers and multiplication factors utilized to obtain the thicknesses of such layers. The factors are to be multiplied with the quarter wavelength of interest. For the reflection of red light, the wavelength of interest may be 666 nanometers, which has a quarter wavelength of 166.5 nanometers. The first layer in Table II is adjacent the optical fluid, and the last layer is adjacent the plate 21b.

TABLE II

| Layer No. | Material | Factor |
|---|---|---|
| 1 | H | 1.339 |
| 2 | L | 1.088 |
| 3 | H | 1.074 |
| 4 | L | 1.088 |
| 5 | H | 1.041 |
| 6 | L | 1.022 |
| 7 | H | 1.008 |
| 8 | L | 1.022 |
| 9 | H | 1.008 |
| 10 | L | 1.022 |
| 11 | H | 1.008 |
| 12 | L | 1.022 |
| 13 | H | 1.008 |
| 14 | L | 1.022 |
| 15 | H | 1.041 |
| 16 | L | 1.088 |
| 17 | H | 1.074 |
| 18 | L | 1.088 |
| 19 | H | 1.339 |

The light valves of the CRT light valve assemblies 23, 25, 27 are optically aligned with the respectively associated green illumination axis GIA, blue illumination axis BIA and red illumination axis RIA so that the respective imaging illumination reflected by the CRT light valve assemblies 23, 25, 27 will be directed along such respective axes which, as defined previously, are coplanar. The color separating assembly 20 further functions to combine the respective polarization modulated illumination respectively reflected by the CRT light valve assemblies 23, 25, 27.

The red polarization modulated imaging light reflected by the CRT light valve assembly 27 is reflected by the parallel plate blue dichroic separator 19 to the rod dichroic separator 21. The red imaging light is reflected from the red dichroic separator 21 and is combined with the green polarization modulated imaging light from the CRT assembly 23 which passes through the red dichroic separator 21.

The blue polarization modulated imaging light reflected by the CRT light valve assembly 25 is reflected by the window 101 to the parallel plate blue dichroic separator 19. The blue imaging light is reflected by the parallel plate blue dichroic separator 19 and is combined with the red and green imaging light that passes through the parallel plate blue dichroic separator 19. The combined red, green, blue (RGB) polarization modulated imaging light is transmitted through the window 101 along the central optic axis COA.

As should be readily evident, the above described color separating assembly 20 advantageously utilizes elements which are selectively positioned to provide desired internal reflections at window/air and coating/air boundaries. Thus, the window 101 transmits the incident unmodulated polarized light from the polarizer/analyzer 17, and also transmits the incident polarization modulated light transmitted and reflected by the parallel plate dichroic color separator 19. However, the window 101 reflects the incident unmodulated polarized blue light reflected by the parallel plate blue dichroic separator 19.

The parallel plate blue dichroic separator 19 transmits the red and green portions of the incident unmodulated polarized light transmitted by the window 101, and also transmits the red and green polarization modulated imaging light from the light valves of the CRT light valve assemblies 23, 27. However, the red unmodulated polarized light reflected by the red dichroic separator 21 is internally reflected by the coating/air boundary formed by the anti-reflection coating 22a and the small air gap 24. The small air gap 24 advantageously provides for internal reflection while minimizing the astigmatism introduced by such air gap 24.

As described previously, the angle of incidence on the red dichroic separator 21 is twelve degrees, and the angle of incidence on the parallel plate blue dichroic separator 19 is twenty-four degrees for light from the polarizer 17 and for the blue polarizaion modulated light reflected by the window 101. Such angles are relatively small so that the polarization sensitivity of the dichroic separators is kept low.

The color separators 19, 21 and the windows 101, 103, 105, 107 are appropriately positioned to provide substantially equal optical paths for the respective red, green, and blue light, which results in an improved projected image. Such appropriate positioning can be readily achieved as a result of the use of internally reflecting elements utilized in the color separating assembly 20. The color combining functions of the color separating assembly 20 allows for the use of a single projection lens 29.

As previously mentioned, the color separating assembly 20 is filled with an index matching optical fluid, such as optical grade oil, which has the same index of refraction as the windows and plates in the color separating assembly 20 and which optically couples such elements. The optical coupling with index matching fluid avoids astigmatism associated with dichroic separators in air, allows for more accurate control of the optical paths of the different colors, and allows for color separation without the use of thick glass wedges which would be subject to distortion producing stress birefringence caused by heat.

The RGB polarization modulated imaging light transmitted through the window 101 illuminates the polarizer/analyzer 17 which polarization analyzes the light and transmits light of the second predetermined polarization state. The imaging light transmitted by the polarizer/analyzer 17 illuminates a projection lens 29 which projects the polarization modulated images of the CRT light valve assemblies 23, 25, 27.

While the color separating assembly 20 has been described in the context of a liquid crystal light valve projector, such color separating assembly may be utilized as a color combining assembly in a full color projection CRT system wherein projection CRT's are used instead of CRT light valve assemblies. In such a projection CRT system, the illumination for projection is provided directly by the projection CRT's.

The foregoing has been a description of a liquid crystal light valve projector which utilizes only one axis of polarization and provides for coplanar location of the color channel axes. Further, the disclosed LCLV projector includes a color separating assembly which is compact, does not utilize thick glass wedges, avoids the astigmatism associated with dichroic color separators in air, has color separators with reduced polarization sensitivity, and allows for substantially equal optical paths for the different colors. As a result, the disclosed LCLV projector provides high contrast, improved projected image quality, increased system efficiency and the capability of being easily packaged.

Although the foregoing has been a description and illustration of specific embodiments of the invention, various modifications and changes thereto can be made by persons skilled in the art without departing from the scope and spirit of the invention as defined by the following claims.

What is claimed is:

1. A projector comprising:
   first color separating means responsive to unmodulated polarized light for reflecting light of a first primary color and for transmitting the remaining portions of the incident unmodulated polarized light, said first color separating means further for internally reflecting incident light;
   optical means for transmitting incident unmodulated polarized light to said first color separating means, and for internally reflecting said light of said first primary color as first primary color incident light;
   second color separating means responsive to the light transmitted by said first color separating means for reflecting light of a second primary as second primary color incident light and for transmitting the remaining portion of the incident light which includes a third primary color incident light, said second color separating means reflecting said light of said second primary color to said first color separating means which internally reflects said second primary color light as second primary color incident light;
   index matching optical fluid for optically coupling said first color separating means, said optical means, and said second color separating means; and
   modulating means responsive to said first primary color incident light, said second primary color incident light, and said third primary color incident light.

2. The projector of claim 1 wherein said first color separating means comprises a parallel plate assembly having parallel plates separated by a small air gap for minimizing astigmatism.

3. The projector of claim 2 wherein one of said parallel plates includes a dichroic coating on the side adjacent the air gap and which is illuminated by the incident unmodulated polarized light, and wherein the other of said parallel plates includes an anti-reflection coating on the side adjacent the air gap which provides a coating-/air boundary for achieving said internal reflection of said second primary color light.

4. The projector of claim 3 wherein said optical means comprises a transparent plate having an air boundary on the side illuminated by the unmodulated polarized light and having a refractive index matched boundary with said index matching optical fluid on the other side.

5. The projector of claim 4 wherein said second color separating means comprises a dichroic color separator.

6. The projector of claim 5 wherein said parallel plate assembly and said dichroic color separator are positioned to provide small angles of incidence to reduce polarization sensitivity.

7. The projector of claim 5 wherein said transparent plate, said parallel plate assembly, and said dichroic color separator are positioned to provide substantially equal optical paths to the respective light of said first primary color, said second primary color, and said third primary color.

8. The projector of claim 5 wherein said first primary color incident light, said second primary color incident light, and said third primary color incident light are respectively incident on coplanar axes.

9. A color separating assembly comprising:
a housing for containing an optical fluid;
first color separating means within said housing responsive to unmodulated polarized light for reflecting light of a first primary color and for transmitting the remaining portions of the incident unmodulated polarized light, said first color separating means further for internally reflecting incident light;
optical means in said housing for providing an air boundary on one side which is illuminated with unmodulated polarized light that is transmitted to said first color separating means, and for internally reflecting said light of said first primary color reflected by said first color separating means;
second color separating means within said housing responsive to the light transmitted by said first color separating means for reflecting light of a second primary color and for transmitting the remaining portion of the incident light which includes light of a third primary color, said second color separating means reflecting said light of said second primary color to said first color separating means which internally reflects said second primary color light; and
index matching optical fluid within said housing for optically coupling said first color separating means, said optical means, and said second color separating means.

10. The color separating assembly of claim 9 wherein said first color separating means comprises a parallel plate assembly having parallel plates separated by a small air gap.

11. The color separating assembly of claim 10 wherein one of said parallel plates includes a dichroic coating on the side adjacent said air gap and which is illuminated by the incident unmodulated polarized light, and wherein the other of said parallel plates includes an anti-reflection coating on the side adjacent said air gap which provides a coating/air boundary for achieving said internal reflection of said second primary color light.

12. The color separating assembly of claim 11 wherein said optical means comprises a transparent plate having an air boundary on the side illuminated by the unmodulated polarized light and having a refractive index matched boundary with said index matching optical fluid on the other side.

13. The color separating assembly of claim 12 wherein said second color separating means comprises a dichroic color separator.

14. The color separating assembly of claim 13 wherein said parallel plate assembly and said dichroic color separator are positioned to provide small angles of incidence to reduce polarization sensitivity.

15. The color separating assembly of claim 13 wherein said transparent plate, said parallel plate assembly, and said dichroic color separator are positioned to provide substantially equal optical paths to the respective light of said first primary color, said second primary color, and said third primary color.

16. The color separating assembly of claim 13 wherein said first primary color light, said second primary color light, and said third primary color light respectively travel along coplanar paths.

17. A light combining assembly for combining respective projection illumination of first, second and third primary colors, comprising:
optical means for internally reflecting the first primary color projection illumination as internally reflected first primary color illumination, and for transmitting other illumination;
first color combining means for reflecting said internally reflected first primary color illumination to said optical means and for internally reflecting the second primary color projection illumination as internally reflected second primary color illumination, said first color combining means further for transmitting other illumination;
second color combining means for reflecting said internally reflected second primary color illumination to said first color combining means and for transmitting the third primary color projection illumination to said first color combining means, whereby said first color combining means transmits said reflected second primary color illumination and said third primary color illumination received from said second color combining means, and whereby said optical means transmits said reflected first primary color illumination received from said first color separating means and also transmits said second and third primary color illumination received from said second color combining means; and
index matching fluid for optically coupling said optical means, said first color combining means, and said second color combining means.

18. The light combining assembly of claim 17 wherein said optical means comprises a transparent plate having a refractive index matched boundary with said index matching optical fluid on one side, and having an air boundary on the other side for achieving said internal reflection of the first primary color incident illumination.

19. The light combining assembly of claim 18 wherein said first color combining means comprises a parallel plate assembly having parallel plates separated by a small air gap.

20. The light combining assembly of claim 19 wherein one of said parallel plates includes a dichroic coating on the side adjacent said air gap and which is illuminated by said first primary color illumination internally reflected by said optical means, and wherein the other of said parallel plates includes an anti-reflection coating on the side adjacent said air gap which provides a coating/air boundary for achieving said internal reflection of said second primary color illumination.

21. The light combining assembly of claim 20 wherein said second color combining means comprises a plate with a dichroic coating.

22. The light combining assembly of claim 21 wherein said parallel plate assembly and said dichroic coated plate are positioned to provide small angles of incidence to reduce polarization sensitivity.

23. The light combining assembly of claim 21 wherein said transparent plate, said parallel plate assembly, and said dichroic coated plate are positioned to provide substantially equal optical paths to the respective illumination of said first primary color, said second primary color, and said third primary color.

24. The light combining assembly of claim 21 wherein said first primary color illumination, said second primary color illumination, and said third primary color illumination respectively travel along coplanar paths.

* * * * *